| United States Patent [19] | [11] | 4,101,311 |
|---|---|---|
| Aonuma et al. | [45] | Jul. 18, 1978 |

[54] PROCESS FOR PRODUCING FERROMAGNETIC METAL POWDER

[75] Inventors: Masashi Aonuma; Yasuo Tamai; Fumio Kodama, all of Odawara, Japan

[73] Assignee: Fuji Photo Film Co., Ltd., Minami-ashigara

[21] Appl. No.: 820,951

[22] Filed: Aug. 1, 1977

[51] Int. Cl.$^2$ .............................................. H01F 1/06
[52] U.S. Cl. ...................................... 75/0.5; 148/31.55; 148/105; 148/108; 252/62.55
[58] Field of Search .................. 75/0.5 AA; 148/105, 148/108, 31.55; 252/62.55

[56] References Cited

U.S. PATENT DOCUMENTS

| 3,943,012 | 3/1976 | Tamai et al. | 75/0.5 AA |
|---|---|---|---|
| 3,966,510 | 6/1976 | Aonuma et al. | 75/0.5 AA |
| 4,009,111 | 2/1977 | Tamai et al. | 75/0.5 AA |
| 4,020,236 | 4/1977 | Aonuma et al. | 75/0.5 AA |

*Primary Examiner*—W. Stallard
*Attorney, Agent, or Firm*—Sughrue, Rothwell, Mion, Zinn and Macpeak

[57] ABSTRACT

A ferromagnetic metal powder having a narrow distribution of coercive force produced by reducing a salt of a metal capable of forming a ferromagnetic material as an aqueous solution thereof, where the reducing reaction is carried out while maintaining the temperature of the aqueous solution during and/or after the reduction reaction at about 20° C higher than the temperature or less of the aqueous solution at the immediate beginning of the reduction reaction.

17 Claims, No Drawings

PROCESS FOR PRODUCING FERROMAGNETIC METAL POWDER

CROSS REFERENCE TO RELATED APPLICATIONS

This application is a continuation-in-part application of Ser. No. 600,245, filed July 30, 1975, now abandoned.

BACKGROUND OF THE INVENTION

1. Field of the Invention

This invention relates to a process for producing a ferromagnetic metal powder, and more specifically, to a process for producing a ferromagnetic metal powder having a hysteresis curve suitable for a magnetic recording material as a result of suppressing the distribution of the coercive force of the magnetic recording material by reducing the distribution of the particle sizes of the ferromagnetic metal powder.

2. Description of the Prior Art

A number of methods for producing ferromagnetic metal powders are known, such as the thermal decomposition of organic acid salts of ferromagnetic metals, followed by reduction with reducing gases (e.g., as disclosed in Japanese Patent Publications Nos. 11412/61, 22230/61, 8027/65, 14818/66, 22394/68, and 38417/72, and *The Record of Electrical and Communication Engineering Conversazione Tohoku University*, Vol. 33, No. 2, pages 57, (1964), the reduction of needle-like oxyhydroxides with or without other metals or needle-like iron oxides obtained therefrom (e.g., as disclosed in Japanese Patent Publications Nos. 3862/60, 20939/64 and 39477/72, British Patent No. 1,192,167, and U.S. Pat. Nos. 3,598,568 and 3,681,018), the evaporation of ferromagnetic metals in inert gases (e.g., as disclosed in Japanese Patent Publication 27718/72 and *Ohyo Butsuri (Applied Physics)*, Vol. 40, No. 1, page 110, 1971), the decomposition of metal carbonyl compounds (.e.g., as disclosed in U.S. Pat. Nos. 2,983,997, 3,172,776, 3,200,007 and 3,228,882), the electrodeposition of ferromagnetic metal powders using a mercury cathode, followed by separating the powders from the mercury (e.g., as disclosed in Japanese Patent Publications No. 15525/64 and 8123/65, and U.S. Pat. No. 3,156,650), and the reduction of salts of ferromagnetic metals in solution (e.g., as disclosed in Japanese Patent Publications Nos. 20520/63, 26555/63, 20116/68, 41718/72, U.S. Pat. Nos. 3,206,338, 3,494,760, 3,567,525, 3,535,104, 3,607,218, 3,663,318, 3,661,556, 3,669,643, 3,672,867, 3,756,866 and German Patent Application (OLS) Nos. 2,132,430, 2,326,258, 2,326,261, etc.

The last method described above which involves reducing a salt of a ferromagnetic metal as a solution thereof produces a ferromagnetic powder having the following defects.

(1) The particle sizes of the powder are widely distributed.

(2) The ferromagnetic powder obtained has a high coercive force, but since the distribution of the coercive force is wide, the slope, i.e., steepness of increase, of the magnetization curve (B-H curve) is poor. This causes a reduction in the sensitivity or the recording density, etc. of magnetic tapes using the ferromagnetic powder obtained.

(3) The dispersibility of the powder in a binder tends to become poor. Thus, a large amount of noise is developed in a magnetic tape using the powder and the tape has a bad S/N (signal-to-noise) ratio.

Various methods have been suggested previously to overcome these defects, such as a method in which the reduction reaction of a salt of a ferromagnetic metal as a solution with a hydrophosphite ion is carried out while applying ultrasonic vibration or magnetic field in order to reduce the distribution of the particle sizes (e.g., as disclosed in Japanese Patent Publication No. 41718/72), a method involving the addition of a protein, or a method involving the addition of a carbohydrate (e.g., both methods as disclosed in U.S. Patent Application Ser. Nos. 498,337 filed Aug. 19, 1974, (Japanese Patent Application (OPI) Nos. 18345/75, 19667/75, and 41506/75) and 498,338, filed Aug. 19, 1974 (Japanese Patent Application (OPI) No. 41756/75)). None of these methods, however, have been found entirely satisfactory

SUMMARY OF THE INVENTION

Accordingly, an object of this invention is to remove the defects of the conventional methods, and to provide a ferromagnetic powder having a narrow distribution of coercive force.

Another object of this invention is to provide a ferromagnetic powder for magnetic recording which has a high coercive force, exhibits a magnetization curve with a slope increasing steeply, has a high residual flux density, and is suitable for high density recording.

Still another object of this invention is to provide a magnetic recording material having superior video sensitivity and a good S/N ratio.

A further object of this invention is to provide a ferromagnetic powder which is suitable not only for magnetic recording, but also for permanent magnets, magnetic cores, magnetic fluid suspensions, or the like.

The above objects of this invention can be achieved in accordance with this invention by a process for producing a ferromagnetic metal powder comprising reducing a salt of a metal capable of forming a ferromagnetic material in an aqueous solution thereof, and maintaining the temperature of the aqueous solution during and/or after the reaction at a point about 20° C higher than the temperature or less of the aqueous solution at the immediate beginning of the reaction.

DETAILED DESCRIPTION OF THE INVENTION

Generally, the reducing reaction of a metal capable of forming a ferromagnetic-material is an exothermic reaction. Especially at low temperatures, say, 40° C or below, the temperature of the solution increases markedly during the reaction, and this tendency is greater with higher concentrations of the solution and larger amounts of the reactants per unit volume. For this reason, the temperature often increases by more than 40° C. The variation in the temperature of the solution during the reaction greatly affects the magnetic characteristics of the powder, and particularly results in wider distributions of the coercive force of the resulting powder. The distribution of the coercive force is determined by estimating the coercive force from the distribution of the anisotropic magnetic field (Hk) which is measured using a magnetic torque measuring device. The distribution of Hk is plotted with the Hk (in Oe) as the abscissa and the volume (in %) as ordinate. The half value width of the distribution curve is expressed in Hk (Oe), and the distribution of Hc is determined from that value (Oe). Furthermore, the slope of the increase in the magnetization curve becomes less steep. This phenomenon can be measured by determining a differential hysterisis curve (dB/dH) of the magnetization (B-H curve) and comparing the values of the width (in the H-axis direction; H: magnetic field) at the half value (in the B-axis direction; B: magnetic flux density) of the peak of the coercive force part of the wave form. (This value will be referred to hereinafter as a "half value width".)

The half value width increases as the variation (i.e., increase) in the temperature of the solution during the reaction increases. It has further been found that this effect is more marked with alloy powders having a higher coercive force. The smaller the half value width, the more narrow is the distribution of the coercive force, and it is possible to reduce the bias current value at the same coercive force at the time of performing magnetic recording. Also, the video sensitivity can be improved, and a high density ratio can be obtained in digital recording. The narrowness of the distribution of the coercive force shows that the particle size is uniform. Accordingly, the ferromagnetic powder obtained has a good particle size distribution, and an increase in noise is prevented to provide a high signal-to-noise ratio.

It has now been found that the above half value width can be reduced when the above reaction is carried out while limiting the increase in the temperature of the solution during the reaction to about 20° C higher than the temperature or less of the solution at the immediate beginning of the reaction, i.e., at the addition of the reducing agent.

When the temperature of the solution at the immediate beginning of the reaction is about 40° C or higher, the increase in the temperature as a result of the exothermic reaction is low because the ambient temperature is lower. However, if the temperature at the immediate beginning of the reaction is below about 30° C, special procedures become necessary. For example, when the temperature of the solution at the immediate beginning of the reaction is about 15° to 30° C, a cooling jacket is provided around the reaction vessel, and the increase of the temperature of the solution can be limited to about 20° C or less above the temperature at the immediate beginning of the reaction by appropriately cooling the reactor with a cooling medium such as water. When the temperature of the solution at the immediate beginning of the reaction is about −10° C to 15° C, the cooling can be performed using a cooling medium such as ice or Dry Ice together with the water, or by usng Dry Ice or an inert liquefied gas such as liquid nitrogen as a cooling medium.

The term "aqueous solution" is used herein to describe a solution mainly of water, but which may contain a water-miscible polar organic solvent. Examples of polar organic solvents include completely or partially water-miscible alcohols, and ketones. Specific examples of suitable solvents which also can be used are methanol, ethanol, isopropyl alcohol, acetone, methyl ethyl ketone, dimethyl sulfoxide, dimethylformamide, tetrahydrofuran, and dioxane. Such as organic solvent can be added in a volume amount up to about one-third of the volume of the total reaction solution.

The phase "salt of a metal capable of forming a ferromagnetic material", as used herein means a salt of any one of Fe, Co, Fe-Co, Fe-Ni, and Fe-Co-Ni. In order to improve the magnetic characteristics and stability to oxidation a suitable amount of a salt of a rare earth metal such as La, Ce, Nd or Sm, or an element such as Sn, Al, W, Cr, Mn, Cu, Zn, Ag, Pd, Ti or Pb can also be present. Specifically, the sulfates, chlorides, sulfides, nitrates, formates, acetates, pyrophosphates and sulfamates of these ferromagnetic metals or these elements are suitable. Specific examples of salts capable of forming a ferromagnetic material are ferrous sulfate, ferric sulfate, ferrous sulfite, ferric sulfite, ferrous chloride, ferric chloride, ferrous pyrophosphate, ferric pyrophosphate, ferrous sulfamate, ferric sulfamate, ferrous formate, ferric formate, ferrous acetate, ferric acetate, cobalt sulfate, cobalt sulfite, cobalt chloride, cobalt pyrophosphate, cobalt sulfamate, cobalt formate, cobalt acetate, nickel sulfate, nickel sulfite, nickel pyrophosphate, nickel chloride, nickel sulfamate, nickel formate, nickel acetate, etc. Specific examples of salts capable of forming the additive elements are lanthanum chloride, lanthanum nitrate, cerium acetate, cerium nitrate, neodymium chloride, samarium chloride, tin chloride, aluminum sulfate, sodium tungstate, tungsten oxidichloride, chromium potassium sulfate, magnesium sulfate, copper sulfate, copper sulfite, copper pyrophosphate, silver nitrite, palladium chloride, titanium tetrachloride, zinc sulfate, zinc sulfite, zinc pyrophosphate, lead acetate, etc.

Usually, the reducing reaction in accordance with the process of this invention is carried out in the presence of a reducing agent. Examples of suitable reducing agents are hypophosphorous acid and the alkali metal (such as sodium, potassium, etc.) and alkaline earth metal (such as calcium, magnesium, etc.) salts thereof, boron hydride compounds and derivatives thereof such as borane, borazane, borohydride, sodium borohydride, potassium borohydride, dimethylaminoborane, diethylaminoborane, etc., hydrazine, an alkali metal hypophosphite such as potassium hypophosphite or sodium hypophosphite, an alkaline earth metal hypophosite such as magnesium hypophosphite, calcium hypophosphite, barium hypophosphite, a divalent metal hypophosphite such as nickel hypophosphite, cobalt hypophosphite, iron hypophosphite, ferric hypophosphite, zinc hypophosphite, manganese hypophosphite, lead hypophosphite, cerium hypophosphite, cerous hypophosphite, and gaseous reducing agents such as hydrogen or carbon monoxide used under pressure. Boron hydride compounds are especially preferred.

The reducing agent is dissolved in water, methanol or a like solvent, preferably water, when used, and it is preferred that hydroxide ion be present in the solution. In this case, the amount of the hydroxide ion affects the weather-resistance of the formed magnetic material. More precisely, when the concentration of the hydroxide ion is in the range of about 0.001N to 0.6N, the weather-resistance of the magnetic substance formed is high. Suitable alkaline materials which can be used to obtain this hydroxide concentration are water soluble, produce hydroxide ions in solution and are capable of generating a pH of higher than about 8. Preferred inorganic hydroxides are the hydroxides of Group I and Group II elements such as sodium hydroxide, potassium hydroxide, barium hydroxide and calcium hydroxide, and suitable examples of organic alkaline materials include n-butylamine, isopropylamine, hydrazine, etc.

When hypophosphorous acid or a derivative thereof is used as a reducing agent, if desired, the reaction solution can further contain a complexing agent and a pH buffer, for example, monocarboxylic acids such as formic acid, acetic acid, propionic acid, butyric acid, valeric acid, trimethylacetic acid, benzoic acid or chloroacetic acid, and the salts thereof; dicarboxylic acids such as oxalic acid, succinic acid, malonic acid, maleic acid, itaconic acid, or p-phthalic acid, and the salts thereof; and hydroxycarboxylic acids such as glycolic acid, lactic acid, salicylic acid, tartaric acid or citric acid, and the salts thereof. Furthermore, boric acid, carbonic acid, sulfurous acid, hydrochloric acid, sulfuric acid, phosphoric acid, nitric acid, ammonium hydroxide, and alkali metal hydroxides can be employed as pH adjusters or pH buffers. Also, if desired, the reaction solution may contain a reaction initiator such as a noble metal ion such as gold, silver, palladium or platinum, a soluble protein, a carbohydrate, or an organic solvent.

The application of ultrasonic vibration during the reaction is also effective for improving the characteristics of the ferromagnetic powder produced.

The preferred reaction pressure is about 0.5 to 5 atmospheres. The reaction temperature (the temperature at the initiation of the reaction) is usually about $-10°$ C to $+100°$ C (e.g., about 60° C or less, preferably about $-10°$ C to $+40°$ C when a boron hydride compound is used as a reducing agent), preferably $-10°$ C to $+30°$ C, although the temperature will vary depending upon the type of the reducing agent employed. The temperature can be reduced during the reaction from the initial temperature, for example, by positively cooling the reaction solution using a cooling medium such as liquid nitrogen.

Preferably, the pH of the reaction solution at the immediate beginning of the reaction is about 12 or less. When a hypophosphite compound is used as a reducing agent, the pH of the solution at the immediate beginning of the reaction ranges from about 5 to 12 and in using a boron hydride compound or a derivative thereof as a reducing agent, the pH of the solution ranges from about 0.5 to 5. A magnetic field can be applied during the reaction, if desired, and a suitable field strength is about 10 Oe or higher, preferably as high as possible. Usually, a suitable field strength ranges from about 500 to 3,000 Oe. The concentration of the metal ion is usually about 0.002 to 2 moles/liter, preferably 0.01 to 0.5 mole/liter. The concentration of the reducing agent is preferably about 0.0002 to 10 moles/liter. A preferred molar ratio of the reducing agent to the metal ion is about 0.1:1 to about 5:1, preferably 0.25:1 to 4:1.

The reaction is initiated by adding the reducing agent or aqueous solution containing reducing agent to the aqueous solution containing the metal salt. The addition time (the time span over which the reducing agent or aqueous solution containing reducing agent is added to the metal salt solution) is a very important factor in the present invention. The addition time should be about one minute or less and preferably is 15 seconds or less. It has been confirmed that inferior effects such as low coercive force, inferior squareness ratio, broad distribution of coercive force and the like are obtained when the reducing agent or aqueous solution containing reducing agent is added over a period of time greater than one minute. Accordingly the adding time should be short.

The addition rate of the reducing agent may be varied with the reaction capacity, i.e., the combined volume of the reducing agent solution and the metal salt solution. For example, when the reaction capacity is ten liters, the reducing agent may be added at a rate of about 0.1 to about 100 mol/sec., and preferably 0.2 to 20 mol/sec. If the reaction capacity is 50 liters, the addition rate may be 1 to 100 mol/sec. Thus, the addition rate of the reducing agent can be adjusted by varying the reaction capacity.

In the present invention, the ferromagnetic powders contain at least about 80% by weight of metals comprising at least about 80% by weight of a metal selected from Fe, Co, or Ni or a mixture thereof, i.e., Fe, Co, Ni, Fe-Co, Fe-Ni, Co-Ni, Fe-Co-Ni as main components, and the ferromagnetic powders preferably contain about 40% by weight or more of Fe. In addition, in addition to these metals described above, if desired, the ferromagnetic powders can contain an amount of about 20% by weight a less, preferably from about 0.5 to 5%, of at least one element of Group IVa, Group VIa, Group VIIa, Group VIII, Group Ib, Group IIb, Group IIIb, Group IVb, and Group Vb. Metal alloy components of the ferromagnetic powders such as Fe-Co-Ti, Fe-Co-Cr, Fe-Co-Mn, Fe-Co-Ni, Fe-Co-Cu, Fe-Co-Zn, Fe-Co-Al, Fe-Co-Pb, Fe-Co-P, Fe-Co-Ni-Ti, Fe-Co-Ni-Cr, Fe-Co-Ni-Mn, Fe-Co-Ni-Cu, Fe-Co-Ni-Zn, Fe-Co-Ni-Al, Fe-Co-Ni-Pb, Fe-Co-Ni-P, Fe-Co, etc. are preferred. A particularly preferred composition of the ferromagnetic powders is about 68 to 89% by weight Fe; about 7 to 34% by weight Co; and about 0.5 to 5% by weight Cr based on the metal composition. The residue of the ferromagnetic powders contains at least one of water, hydroxides, oxides, fatty acid salts, etc.

The surface of the ferromagnetic metal powder obtained by the reduction reaction in accordance with the present invention can be effectively treated with an anionic surface active agent as described in Japanese Patent Application (OPI) No. 33758/76. Examples of fatty acid salts described above include alkali metal or alkali earth metal salts of saturated or an unsaturated fatty acids comprising an alkali metal such as Na, K, etc., an alkaline earth metal such as Mg, Ca, etc., a saturated fatty acid such as lauric acid, myristic acid, palmitic acid, stearic acid, etc., and an unsaturated fatty acid such as undecylic acid, oleic acid, elaidic acid, linolic acid, linolenic acid, etc.

The ferromagnetic powder obtained under the above conditions has superior properties for use in preparing magnetic recording media, and can be produced in large quantities in a stable manner. Some of the advantages of the resulting ferromagnetic powder produced are specifically described below.

(1) The ferromagnetic powder has a uniform particle size, and a reduced coercive force distribution.

(2) The ferromagnetic powder obtained can be easily dispersed together with a binder, and a magnetic tape produced using the ferromagnetic powder has improved surface characteristics and orientability in a magnetic field.

(3) As a result of (1) and (2), the bias current at the time of magnetic recording can be reduced.

(4) The powder provides high sensitivity.

(5) The powder provides an increased signal-to-noise ratio.

Since the process of this invention can be used to produce magnetic recording ferromagnetic powders in a stable manner by a relatively simple procedure, it is very advantageous commercially.

Binders which can be used together with the ferromagnetic powder materials of the present invention include conventional thermoplastic resins, thermosetting resins and mixtures thereof. These resins can be used individually or in the form of a mixture.

Useful thermoplastic resins have a softening point of lower than about 150° C, a mean molecular weight of about 10,000 to 200,000 and a degree of polmerization of about 200 to 2,000, and include the following polymers; vinyl chloride-vinyl acetate copolymers, vinyl chloride-vinylidene chloride copolymers, vinyl chloride-acrylonitrile copolymers, acrylic ester-vinylidene chloride copolymers, acrylic ester-styrene copolymers, methacrylic ester-acrylonitrile copolymers, methacrylic ester-vinylidene chloride copolymers, methacrylic ester-styrene copolymers, urethane elastomers, polyvinyl fluoride resins, vinylidene-chloride-acrylonitrile copolymers, butadiene-acrylonitrile copolymers, polyamide resins, polyvinyl butyral, cellulose derivatives (cellulose acetate butyrate, cellulose diacetate, cellulose triacetate, cellulose propionate, nitrocellulose), styrene-butadiene copolymers, polyester resins, chlorovinyl etheracrylic ester copolymers, amino resins, various synthetic rubber resins and mixtures thereof.

These thermoplastic binder resins are described in Japanese Patent Publication Nos. 6877/62, 12528/64, 19282/64, 5349/65, 20907/65, 9463/66, 14059/66, 66985/66, 6428/67, 11621/67, 4623/68, 15206/68, 2889/69, 17947/69, 18232/69, 14020/70, 14500.70, 18573/72, 22068/72, 22069/72, 22070/72, and 27886/72, and U.S. Patent Nos. 3,144,352, 3,419,420, 3,499,789 and 3,713,887.

Useful thermosetting resins have a molecular weight of less than about 200,000 as a coating solution, but the molecular weight becomes infinity due to the condensation and addition reactions occurring on heating the coating solution. Such resins are preferably not softened or melted before they thermally decompose. Examples of thermosetting resins are phenol resins, epoxy resins, polyurethane hardening resins, urea resins, melamine resins, alkyd resins, silicone resins, acrylic reactive resins, epoxy-polyamide resins, nitrocellulose-melamine resins, a mixture of a high molecular weight polyester resin and an isocyanate prepolymer, a mixture of a methacrylic copolymer and a diisocyanate prepolymer, a mixture of a polyesterpolyol and a polyisocyanate, urea-formaldehyde resins, a mixture of a low molecular weight glycol, a high molecular weight diol and triphenylmethane-triisocyanate, polyamine resins and mixtures thereof.

These resins are described in Japanese Patent Publication Nos. 8103/64, 9779/65, 7192/66, 8106/66, 14275/66, 18179/67, 12081/68, 28023/69, 14501/70, 24902/70, 13103/71, 22065/72, 22066/72, 22067/72, 22072/72, 22073/72, 28045/72, 28048/72 and 28922/72, and U.S. Pat. Nos. 3,144,353, 3,320,090, 3,437,510, 3,597,273, 3,781,210, and 3,781,211.

The binder can be used individually or as mixtures thereof. Other ingredients, such as dispersing agents, lubricants, abrasive agents and anti-static agents, can be added to the binder. The weight ratio of the ferromagnetic powder to the binder can suitably range from about 100:10 to 100:200, preferably 100:25 to 100:120.

Useful dispersing agents have the formula $R_1COOH$ (where $R_1$ is an alkyl or alkenyl group having 11 to 17 carbon atoms), e.g., caprylic acid, capric acid, lauric acid, myristic acid, palmitic acid, stearic acid, oleic acid, elaidic acid, linolic acid, linolenic acid, stearolic acid, etc., alkali metal (Li, Na, K, etc.) or alkaline earth metal (Mg, Cs, Ba, etc.) salts of these fatty acids, and lecithin. Higher alcohols having more than 12 carbon atoms and the sulfuric esters thereof can be used.

Such a dispersing agent is employed in the binder in a weight ratio of the dispersing agent to the binder of about 0.5:100 to 20:100. Suitable dispersing agents are described in Japanese Patent Nos. 28369/64, 17945/69 and 15001/73, and U.S. Pat. Nos. 3,387,993 and 3,470,021.

Useful lubricants are silicone oils, graphite, molybdenum disulfide, tungsten disulfide, fatty acid esters of monocarboxylic fatty acids having 12 to 16 carbon atoms and monohydric alcohols having 3 to 12 carbon atoms, and fatty acid esters of monocarboxylic fatty acids having more than 17 carbon atoms and monohydric alcohols, in which the total number of carbon atoms in the ester is 15 to 28. 0.2 to 20 weight parts of such a lubricant are generally employed per 100 parts of the binder. These lubricants are disclosed, for example, in Japanese Patent Publication No. 23889/68, 24041/73 and 18482/73, U.S. Pat. Nos. 2,654,681, 3,274,111, 3,276,946, 3,293,066, 3,398,011, 3,470,021, 3,492,235, 3,523,086, 3,625,760, 3,630,772, 3,634,253, 3,647,539, and 3,687,725, Canadian Patent Nos. 535,575 and 728,591, British Patent No. 793,520, and German Pat No. (DT-AS) 1,221,282, etc.

Useful abrasives are fused alumina, silicon carbide, chromium oxide, corundum, synthetic corundum, diamond, synthetic diamond, garnet and emery (main components are corundum and magnetite). A suitable abrasive has a mean particle size of about 0.05 to 2 $\mu$m, preferably 0.1 to 2 $\mu$m. Generally about 0.5 to 20 weight parts of the abrasive particles are employed per 100 weight parts of the binder. These abrasive agents are described, for example, in Japanese Patent Application Pat. Nos. 3,007,807, 3,293,066, 3,630,910 and 3,687,725, British Patent No. 1,145,349, and German Pat. No. (DT-PS) 853,211, etc.

Useful anti-static agents are inorganic materials such as carbon black; organic materials such as saponin or like natural surfactants, alkyleneoxides, glycerin, glycidol or like nonionic surfactants, higher alkylamines, quaternary ammonium salts, pyridinium or like heterocylclic compounds, phosphonium, sulfonium or like cationic surfactants, carboxylic acids, sulfonic acids, phosphoric acids, anionic surfactants containing sulfuric acid ester groups, phosphoric acid ester groups or like acidic groups, aminoacids, aminosulfonic acids, sulfuric or phosphoric esters of aminoalcohols or like ampholytic surfactants. A suitable amount of the inorganic material is about 5% by weight and of the organic material is about 0.5 to 1% by weight, each based on the weight of the ferromagnetic material.

Some of these surfactant compounds used as the anti-static agents are described in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174 and 3,545,974, German Patent Application (OLS) 1,942,665, British Patent Nos. 1,007,317 and 1,198,450, R. Oda et al, *Synthesis of the Surface Active Agents and Their Applications*, Maki Shoten (1964), A. M. Schwartz et al, *Surface Active Agents*, Interscience Publications Inc., (1958), J. P. Sisley et al, Encyclopedia of Surface Active Agents, Vol. 2, Chemical Publishing Co., (1964), and *Surface Active Agent Handbook*, 6th Edition, Sangyo Tosho K.K., (Dec. 20, 1966).

These surface active agents can be used individually or as mixtures. The surfactant is used not only for inhibiting the formation of static electricity but also for improving the dispersing, lubricating and coating properties and the magnetic properties of the resulting recording member.

The formation of the magnetic recording layer can be carried out by dispersing the iron oxide mixture in an organic solvent and applying the resulting composition on a support. A suitable coating thickness of the magnetic layer on the support ranges from about 0.5 to 20 μm, preferably 2 to 15 μm.

The non-magnetic support can have a thickness of about 2.5 to 100 μm, preferably 3 to 40 μm, for a tape, and suitable supports and polyethylene terephthalate, polyethylene naphthalate or like polyesters, polypropyrene or like polyolefins, cellulose triacetate, cellulose diacetate or like cellulose derivatives, polyvinyl chloride or like vinyl resins, polycarbonate or like synthetic resins, aluminum, copper or other metals, glass or ceramics, etc.

Useful organic solvents for kneading the iron oxide particles and coating the resulting composition are acetone, methyl ethyl ketone, methyl isobutyl ketone, cyclohexanone or like ketones, methanol, ethanol, propanol, butanol or like alcohols, methyl acetate, ethyl acetate, butyl acetate, ethyl lactate, glycol acetate monoethyl ether, or like esters, diethyl ether, glycol dimethyl ether, glycol monoethyl ether, dioxane or like ethers, benzene, toluene, xylene, or like aromatic hydrocarbons, methylene chloride, ethylene chloride, carbon tetrachloride, chloroform, ethylene chlorohydrin, dichlorobenzene or like chlorinated hydrocarbons, etc.

For coating the iron oxide containing mixture on a support, an air doctor coating method, a blade coating method, am air knife coating method, a squeeze coating method, a dip coating method, a reverse roll coating method, a transfer roll coating method, a kiss coating method, a cast coating method, and a spray coating method can be used. The details of these coating methods are described in *Coating Engineering*, pp. 253 to 277, Asakura Shoten (Mar. 20, 1971).

The magnetic layer coated on the support by the above method is dried after, if desired, coated has been subjected to a treatment for orienting the magnetic powder in the layer. Suitable treatments for orienting the magnetic powder in the layer are disclosed in U.S. Pat. Nos. 1,949,840, 2,796,359, 3,001,891, 3,172,776, 3,416,949, 3,473,960, and 3,681,138; Japanese Patent Publication Nos. 3427/1957, 28368/1964, 23624/1965, 23625/1965, 13181/1966, 13043/1973 and 39722/1973. If required, the magnetic layer can be subjected to a surface-smoothening treatment, or cut to the desired shape, thereby to form the magnetic recording material of this invention. Suitable surface-smoothening techniques are disclosed U.S. Pat. Nos. 2,688,567, 2,998,325, and 3,783,023, and German Patent Application (OPI) No. 2,405,222.

In the above orienting treatment for the magnetic layer, the orienting magnetic field can be either an AC or DC magnetic field with a field strength of about 500 to 2000 Gauss. The drying temperature can range from about 50° to about 100° C, and the drying time is about 3 to 10 minutes.

In the surface-smoothening treatment of the magnetic layer, preferably a calendering method is used in which the magnetic layer is passed between a metal roll and a non-metallic roll while the layer is heated under pressure. A combination of a metal roll and a roll made of cotton and a combination of a metal roll and a roll made of a synthetic resin are especially preferred. The pressure used in this treatment is about 25 to 500 Kg/cm, and the surface temperature of the metal roll is kept at about 35° to 150° C. The rate of the treatment is about 5 to 120 meters/min. When the pressure and temperature are below the lower limits of the above-specified ranges, the effect of the surface-smoothening treatment is difficult to achieve. Pressures and temperatures higher than the upper limits of the above specified ranges are not preferred because the support of the magnetic recording material is deformed. When the treating rate is less than about 5 meters/min. the operating efficiency is low, and if the rate is above about 120 meters/min, the operation is difficult.

The magnetic recording medium provided according with the present invention has a $B_m$ value of about 2,500 Gauss or more.

The following Examples and Comparative Examples are given to illustrate the present invention more specifically. It will be readily understood by those skilled in the art that the components, proportions, and sequence of procedures shown therein can be changed or modified within the spirit and scope of the present invention. Accordingly, the invention is not to be construed as being limited to these Examples. Unless otherwise indicated herein all parts, percents, ratios and the like are by weight.

EXAMPLE 1

|  | Mole/liter |
|---|---|
| $M_1$ Aqueous Solution | |
| Ferrous Sulfate | 0.345 |
| Cobalt Sulfate | 0.145 |
| Potassium Chromium Sulfate | 0.010 |
| $R_1$ Aqueous Solution | |
| NaBH$_4$ | 1.25 |
| (0.5N NaOH aqueous solution) | |

100 parts of $M_1$ Solution described above was placed in a stainless steel vessel and, with stirring, cooled with cold water from outside the vessel to maintain the solution at 20° C. Separately, 40 parts of $R_1$ Solution was cooled to 20° C. While applying a direct current magnetic field of a field strength of about 1,000 Oe to the stainless steel vessel containing the $M_1$ Solution, the $R_1$ Solution was added thereto over a period of 15 seconds at an addition rate of 0.667 mole/sec. while cooling the reaction solution from outside the vessel with cold water, thereby to precipitate a ferromagnetic powder. The reaction volume was 28 liters. The reaction temperature at the beginning of the reaction was 20° C, and in 30 seconds, the temperature increased to the maximum temperature of 35° C, and decreased to 25° C 2 minutes after the beginning. The thus obtained ferromagnetic powder was washed with water, and then treated with a 0.25% by weight sodium oleate aqueous solution to adsorb sodium oleate onto the surface of the ferromagnetic powder. Subsequently, the water was removed. Then, the ferromagnetic metal powder was dried in a nitrogen atmosphere at 120° C. The ferromagnetic metal powder was analyzed and it was found that the ferromagnetic metal powder comprised 55.8% by weight Fe, 22.2% by weight Co, 4.0% by weight Cr, 3.2% by weight B, the remainder comprising water, hydroxides, oxides, oleic acid, etc. This sample was designated P-1.

A composition of the following formulation was placed in a ball mill, and sufficiently mixed and dispersed to form a magnetic coating composition.

|  | Parts by weight |
|---|---|
| Ferromagnetic Powder (average particle diameter: 300 A) | 300 |
| Polyster-Polyol (condensation product of adipic acid and butylene | |

-continued

| | Parts by weight |
|---|---|
| glycol and having a hydroxyl number of 300) | 40 |
| Polyisocyanate (an adduct of toluylene diisocyanate and trimethylol propane) | 20 |
| Nitrocellulose | 20 |
| Aluminum Oxide (average particle diameter: 0.15 micron) | 5 |
| Lecithin | 3 |
| Methyl Ethyl Ketone | 450 |
| Methyl Isobutyl Ketone | 400 |

The above coating composition was coated on one surface of a polyethylene terephthalate film having a thickness of 25 microns in a dry thickness of 5 microns while applying a magnetic field, and dried by heating. The wide magnetic web so obtained was subjected to a supercalender treatment and slit to a width of ½ inch to form a video tape. The tape obtained had very good surface characteristics. The resulting sample tape was designated T-1.

| $M_2$ Aqueous Solution | |
|---|---|
| Ferrous Chloride | 0.36 M/liter |
| Cobalt Chloride | 0.04 M/liter |
| $C_7H_4NO_3$ . Na . $2H_2O$ (soluble saccharin) | 2 g/liter |
| $R_2$ Aqueous solution | |
| $NaBH_4$ | 1.6 M/liter |

80 parts of the $M_2$ Solution was placed in a jacketed stainless steel vessel, and the temperature of the solution was adjusted to 20° C by externally cooling the vessel with cooling water. Separately, 20 parts of the $R_3$ Solution was maintained at 20° C using a similar procedure. The $R_2$ Solution was added to the $M_2$ Solution over a 10 second period in a direct current magnetic field of an average field strength of 1,000 Oe thereby to precipitate a ferromagnetic powder.

At the immediate beginning of the reaction, the reaction temperature was 20° C. During the reaction, the temperature increased and reached 31.5° C at the highest. The resulting magnetic powder was treated in the same way as in Example 1 to form a powder sample (designated P-2).

Using this powder, a magnetic coating composition was prepared under the same conditions as in Example 1, and using the coating composition, a video tape with a width of ½ inch was produced in the same manner as in Example 1. The resulting tape sample was designated T-2.

EXAMPLE 3

Four $M_3$ Aqueous Solutions ($M_3$-1 to $M_3$-4) were prepared as shown in Table 1 below.

Table 1

| Samples No. | Elements Added to $M_3$ Aqueous Solution (mole/liter) | | | | | |
|---|---|---|---|---|---|---|
| | Fe | Co | Ti | Mn | Pb | P |
| $M_3$-1 | 0.68 | 0.27 | 0.05 | — | — | — |
| $M_3$-2 | 0.68 | 0.27 | — | 0.05 | — | — |
| $M_3$-3 | 0.68 | 0.27 | — | — | 0.05 | — |
| $M_3$-4 | 0.68 | 0.27 | — | — | — | 0.05 |

The elements added above were added in the form of the following compounds.

| Fe: | $FeCl_2$ . $nH_2O$ |
|---|---|
| Co: | $CoCl_2$ . $6H_2O$ |

-continued

| Ti: | $Ti(SO)_2$ (40% aqueous solution) |
|---|---|
| Mn: | $MnSO_4$ . $4H_2O$ |
| Pb: | $Pb(C_2H_3O_2)_2$ . $2H_2O$ |
| P : | $NaH_2PO_2$ . $2H_2O$ |

A 0.01 N NaOH solution of $NaBH_4$ (2.5 moles/liter) was used as the $R_3$ Solution. Using the $M_3$-1 to $M_3$-4 Solutions and the $R_3$ Solution, the reaction was carried out at 20° C using the same procedure as in Example 2. During the reaction, cooling was continued to minimize the increase in temperature. The temperature increased as shown below for each of the samples.

| Solution | Temperature Increased To |
|---|---|
| $M_3$-1 | 37° C (17° C increase) |
| $M_3$-2 | 28° C (8° C increase) |
| $M_3$-3 | 33° C (13° C increase) |
| $M_3$-4 | 32° C (12° C increase) |

Each of the resulting ferromagnetic powders was washed with water, and acetone, and dried in a hot air dryer at 45° C. The resulting ferromagnetic powders were designated P3-1 to P3-4 corresponding to the $M_3$-1 to $M_3$-4 solutions, respectively.

Video tapes, ½ inch wide, were produced in the same manner as in Example 1 using the resulting ferromagnetic powders. The samples of video tapes were designated T3-1 to T3-4, respectively. The characteristics of these samples are shown in Tables 2 and 3 below and it was found that the resulting ferromagnetic powders had superior characteristics.

Table 2

| Sample No. | Particle Size | δ s (saturation magnetization) at H = 2000 Oe |
|---|---|---|
| | (A) | (emu/g) |
| P3-1 | 200 – 300 | 102 |
| P3-2 | 250 – 300 | 100 |
| P3-3 | 250 – 350 | 100 |
| P3-4 | 250 – 350 | 97 |

Table 3

| Sample No. | Hc (coercive force) | Br/Bs | Half Value Width of the Differential Wave Form of Magnetization Curve | Bias Current* |
|---|---|---|---|---|
| | (Oe) | | (Oe) | (%) |
| T3-1 | 850 | 0.85 | 500 | 160 |
| T3-2 | 1000 | 0.84 | 550 | 195 |
| T3-3 | 1000 | 0.85 | 550 | 190 |
| T3-4 | 950 | 0.83 | 550 | 190 |

*values when the bias current of a $CrO_2$ tape is taken as 100%

EXAMPLE 4

| $M_4$ Aqueous Solution | |
|---|---|
| Ferrous Chloride | 0.32 mole/liter |
| Cobalt Chloride | 0.08 mole/liter |
| Chromium Alum | 0.01 mole/liter |
| Lead Acetate | 0.01 mole/liter |
| $R_4$ Aqueous Solution | |
| Sodium Borohydride (a 0.01 N NaDH aqueous solution) | 1.8 mole/liter |

80 parts of $M_4$ Solution having the above composition was placed in a stainless steel vessel, with stirring, cooled with water from outside the vessel to keep the solution at 0° C. Separately, 20 parts of $R_4$ Solution described above was cooled similarly to 0° C. Then, while a direct current magnetic field of a field strength of about 1,000 Oe was applied to the stainless steel vessel containing the $M_4$ Solution, the $R_4$ Solution was added thereto over a period of 10 seconds while cooling the vessel from outside with Dry Ice and water. The reaction occurred vigorously to precipitate a ferromagnetic powder. The highest reaction temperature during the reaction was 9° C. After being dried in the same manner as in Example 3, a ferromagnetic powder was obtained (designated P-4).

Using the resulting ferromagnetic powder, a video tape (designated T-4) was produced in the same manner as in Example 1. The resulting tape had good surface characteristics.

The powder (P-4) had a particle size of 200 to 300 A, and a δ s in a magnetic field of H=2000 Oe of 105 emu/g. The tape (T-4) had a coercive force (Hc) of 900 Oe, a maximum magnetic flux density (Bm) of 3,400 Gauss, a squareness ratio (Br/Bs) of 0.85, a half value width of the differential wave form of 5000 Oe. In comparison with a $CrO_2$ tape, the bias current for this sample was 170%. The video output at 5 MHz was +4.5 dB, and the modulation noise at 4.9 MHz was +1 dB.

These results demonstrate that the ferromagnetic powder obtained in this Example is superior for high density recording.

COMPARATIVE EXAMPLE 1

The same reaction as in Example 1 was carried out using the same solutions as described in Example 1 except that the reaction system was not cooled. During the reaction, the temperature increased and reached 48° C at the highest, although the temperature at beginning of the reaction was 20° C.

A ferromagnetic powder was prepared in the same way as in Example 1 (designated Pc-1), and a video tape, ½ inch wide, was produced in the same manner as in Example 1 (designated, Tc-1)

COMPARATIVE EXAMPLE 2

The same reaction as in Example 2 was repeated using the same solutions as described in Example 2 except that the reaction system was not cooled and the reaction was carried out open to the atmosphere. During the reaction, the temperature increased, and reached 42° C at the highest. A powder was obtained in the same manner as in Example 1 (designated Pc-2). A video tape, ½ inch wide, was produced in the same manner as in Example 1 (designated Tc-2).

The properties of the powder samples and the tape samples obtained in Examples 1 and 2 and Comparative Examples 1 and 2 are shown in Tables 4 and 5 for easy comparison.

Table 4

| Property | Sample | | | |
|---|---|---|---|---|
| | P-1 | P-2 | Pc-1 | Pc-2 |
| Particle Size (A) | 250 – 350 | 200 – 300 | 100 – 400 | 50 – 0 400 |
| δ s (saturation magnetization at H = 2,000 Oe) (emu/g) | 109 | 98 | 99 | 85 |
| Distribution of Hk (half value width) (Oe) | 1480 | 2050 | 3100 | 3520 |

Table 5

| Property | Sample | | | |
|---|---|---|---|---|
| | T-1 | T-2 | Tc-1 | Tc-2 |
| Hc (Oe) | 950 | 1,100 | 920 | 1,050 |
| Br/Bs | 0.86 | 0.86 | 0.83 | 0.83 |
| Half Value Width of the Differential Wave Form of Magnetization Curve (Oe) | 500 | 680 | 550 | 730 |
| Bias Current (value for a $CrO_2$ tape taken as 100%) (%) | 160 | 200 | 175 | 220 |
| Video Output at 5 MHz (value for a $CrO_2$ tape taken as 0 dB) | + 5.5 dB | + 4 dB | 0 dB | + 1 dB |
| Modulation Noise at 4.9 MHz (value for a $CrO_2$ tape taken as 0 db) | + 1 dB | + 3 dB | + 5 dB | + 7 dB |

These results show that the ferromagnetic metal powders of this invention have a narrow distribution of particle sizes even though there is not much difference in average particle size, and have somewhat high δs. From the Hk distribution, it can be said that with the ferromagnetic powder in accordance with this invention, the distribution of the Hc is narrow, and therefore, the amount of the high Hc component which is difficult to demagnetize as well as the amount of the low Hc component which becomes a cause of print through are reduced. When tapes are made using the ferromagnetic powder of this invention, the bias current at the same Hc value is lower. The dispersibility of the ferromagnetic metal powder in a binder is improved, and the steepness of the increase of the magnetization and the squareness ratio are improved. As a result, the video sensitivity is increased, and the S/N ratio is improved. These properties are superior to those of $CrO_2$ tapes. The ferromagnetic metal powders obtained by this invention therefore have high utilitarian value in producing magnetic recording materials.

COMPARATIVE EXAMPLE 3

The same reaction as in Comparative Example 1 was carried out except the addition times and rates for the $R_1$ aqueous solution shown in Table 6 were used (Pc-3 to Pc-7). The reaction volume was again 28 liters. During the reaction the temperature reached the maximum shown in Table 6 (Pc-3 to Pc-7). The temperature at beginning of the reaction was 20° C.

The ferromagnetic powders (Pc-3 to Pc-7) and video tapes (Tc-3 to Tc-7), ½ inch wide, were prepared as in Example 1. The results are shown in Table 6.

COMPARATIVE EXAMPLE 4

The same reaction as in Comparative Example 1 was carried out except the addition time for the $R_1$ aqueous solution was changed to 3 seconds. During the reaction, the temperature increased to the maximum shown in Table 6 (Pc-8). Again, the temperature at the beginning of the reaction was 20° C.

The ferromagnetic powder Pc-8 was prepared in the same way as in Example 1, and video tapes ½ inch wide were also produced as in Example 1 (designated, Tc-8). The results are shown in Table 6.

EXAMPLE 5

The same reaction as in Example 1 was carried out except the addition time for the $R_1$ aqueous solution was changed to 3 seconds. During the reaction, the temperature increased to the level shown in Table 6 (P-5) at the highest. The temperature at beginning of the reaction was 20° C.

The ferromagnetic powder P-5 and video tapes ½ inch wide were produced in the same manner as in Example 1 (designated T-5). The results are shown in Table 6 below.

Table 6

| Sample Nos. | time of R₁ Solution | Addition Rate (Mole/Sec.) | Initial Temperature of reaction (° C) | Maximum temperature during reaction (° C) | Particle size (A) | H/C (Oe) | Br/Bs | Half Value width of the Differential Wave Form of Magnetization Curve (Oe) |
|---|---|---|---|---|---|---|---|---|
| P-1,(T-1) | 15 sec. | 0.667 | 20 | 35(15)* | 250 – 350 | 950 | 0.86 | 500 |
| Pc-1,(Tc-1) | 15 sec. | 0.667 | " | 48(24) | 100 – 400 | 920 | 0.83 | 550 |
| Pc-3,(Tc-3) | 30 sec. | 0.333 | " | 45(25) | 90 – 410 | 900 | 0.83 | 580 |
| Pc-4,(Tc-4) | 60 sec. | 0.167 | " | 41(21) | 85 – 430 | 870 | 0.81 | 600 |
| Pc-5,(Tc-5) | 5 min. | 0.033 | " | 30(10) | 75 – 450 | 790 | 0.79 | 560 |
| Pc-6,(Tc-6) | 10 min. | 0.017 | " | 24 ( 4) | 60 – 500 | 600 | 0.62 | 480 |
| Pc-7,(Tc-7) | 15 min. | 0.011 | " | 22 ( 2) | 50 –0 600 | 230 | 0.48 | 260 |
| Pc-8,(Tc-8) | 3 sec. | 3.333 | " | 52(32) | 100 – 400 | 950 | 0.85 | 500 |
| P-5,(T-5) | 3 sec. | 3.333 | " | 37(17) | 250 – 350 | 950 | 0.88 | 460 |

* The difference between the Initial Temperature and the Maximum Temperature

While the invention has been described in detail and with reference to specific embodiments thereof, it will be apparent to one skilled in the art that various changes and modifications can be made therein without departing from the spirit and scope thereof.

What is claimed is:

1. A process for producing a ferromagnetic metal powder comprising:
    (a) adding a reducing agent to an aqueous solution of a salt of Fe, Co, Fe-Co, Fe-Ni, Co-Ni or Fe-Co-Ni at a rate of 0.1 to about 100 mole/sec. over an addition time of one minute or less, the temperature of said salt solution being −10° to 40° C at the start of said addition, and
    (b) during the course of the reduction maintaining the temperature of said aqueous solution at a temperature not more than about 20° C higher than the temperature of said salt solution at the start of the addition.

2. The process of claim 1, wherein said reducing agent is selected from the group consisting of hypophosphorous acid, an alkali metal salt or alkaline earth metal salt of hypophosphorous acid, a boron hydride compound or a derivative thereof, and a gaseous reducing agent.

3. The process of claim 2 wherein said reducing agent is a boron hydride compound or a derivative thereof.

4. The process of claim 2 wherein said reducing agent is hypophosphorus acid or a derivative thereof.

5. The process of claim 1, wherein the reaction pressure is 0.5 to 5 atmospheres.

6. The process of claim 1, including applying ultrasonic vibration to the reaction solution during the reaction.

7. The process of claim 1, wherein the reaction is carried out in a magnetic field.

8. The process of claim 1, wherein the concentration of the metal ion capable of forming a ferromagnetic material in the aqueous solution is about 0.002 to 2 mole/liter.

9. The process of claim 1, wherein the concentration of the metal ion capable of forming a ferromagnetic material in the aqueous solution is 0.01 to 0.5 mole/liter.

10. The process of claim 1, wherein the concentration of said reducing agent is about 0.0002 to 10 moles/liter.

11. The process of claim 1, wherein the molar ratio of the reducing substance to the metal ion is about 0.1 to 5.

12. A magnetic recording medium which comprises a support having thereon a magnetic layer of the ferromagnetic metal powder as produced in claim 1 and a binder.

13. The process of claim 1 wherein said addition rate is 0.2 to 20 mole/second.

14. The process of claim 1 wherein the reaction volume is 10 liters.

15. The process of claim 1 wherein the reaction volume is 50 liters and the addition rate is 1 to 100 mole/second.

16. The process of claim 1 wherein said metal salt solution contains in addition a metal salt selected from the group consisting of La, Ce, Nd, Sm, Sn, Al, W, Cr, Mn, Cu, Zn, Ag, Pd, Ti and Pb.

17. The process of claim 1 wherein the addition time is 15 seconds or less.

* * * * *